Patented June 12, 1934

1,962,823

UNITED STATES PATENT OFFICE 1,962,823

INTAGLIO PRINTING INK

Hans Kurz and Karl Albert, Vienna, Austria

No Drawing. Application December 27, 1932, Serial No. 649,112. In Austria December 3, 1931

1 Claim. (Cl. 134—36)

This invention relates to intaglio printing inks.

The inks of this kind previously employed can be divided into three groups, viz.

(1) Inks having a binding medium which contains only an organic solvent;

(2) Inks having a binding medium which contains only water;

(3) Inks having a binding medium which contains both an organic solvent and water.

Owing to their composition the inks of the first group are inflammable and, in addition, on account of the ready volatility of the solvent used, are injurious to the health. Soon after these inks came into use attempts were therefore already being made to make inks free from these disadvantages. In this way the water inks of the second group were formed containing a binding agent consisting of aqueous albumin solutions and sulpho-oleic acids or of glue solutions treated with hardening agents. According to Hadert ("Handbuch über die Herstellung und Verwendung der Druckfarben," 1931 Otto Elsner, Berlin, S. 42, Oranienstrasse 140 to 142) the varnishes for water intaglio printing inks consist of an emulsion made of water, dextrin, starch flour, and resins saponified with soda lye, cellulose extracts, casein, and so forth. These binding agents, however, when rubbed or ground with pigments, yield inks, which give impressions which are not water-resisting. The inks of the third group arose from the endeavours to attain resistance to water. These inks contain as binder either emulsions of aqueous colloid solutions with hydrocarbons as described in U. S. Patent No. 1,725,649, or alkaline resin solutions in mixtures of water with water-soluble organic solvents as described in Austrian Patent No. 124,742 corresponding to U. S. Patent No. 1,890,996. In the case of the inks containing hydrocarbons, however, the inflammability and toxicity are reduced as compared with the inks of the first group but not completely removed.

The present invention provides a process for making intaglio printing inks in which the pigments are rubbed up with a binder consisting of a solution of resin in aqueous alkali, the binder according to the invention being prepared without addition of water-soluble organic solvents and consisting only of a solution of resin in alkali, which latter is present partly as fixed alkali and partly as ammonia.

It has been found that aqueous-alkaline resin solutions are also capable of binding pigments so that when the same are applied they are water-resisting provided that the quantity of fixed alkali necessary for saponifying the resin is partly replaced by ammonia. The use of ammonia has indeed already been disclosed in Austrian Patent No. 124,742; whereas, however, in this prior disclosure, owing to the presence of resin solvents the quantity of fixed alkali or of ammonia necessary for complete saponification of the resin must not be used in order to obtain a useful binding agent, and, on the other hand, even when using the quantity of alkali necessary for complete saponification such inks when applied and impressions made therefrom are forthwith water-insoluble and ineffaceable, this is not the case with inks made according to the following specification. It was not to be foreseen, therefore, that aqueous-alkaline resin solutions could effect a water-resisting binding of pigments without addition of water-soluble organic solvents. It has been found, however, that such inks, as well as the applications, prints and impressions thereof, are water-soluble and effaceable in the fresh state, but surprisingly enough gradually pass over into the insoluble state and can then no longer be effaced. A colloidal maturing process seems to be involved here, since such inks yield directly water-resisting inks if the binder has previously been heated for a long time to a raised temperature.

Such a binder is only suited for making useful printing inks if it is capable of satisfactorily holding the pigments in suspension. This, for aqueous-alkaline resin solutions, is not the case as regards all pigments. In such cases an addition of colloids, preferably of casein or glue, is of assistance. Further it is necessary to remove the property of frothing associated with alkaline resin solutions like all soap solutions, which depend upon their surface activity. This can be effected by means of known defrothing agents; preferably a small addition of ethereal oils is made, since these dissolve satisfactorily in alkaline resin solutions.

The resin, colophony, is preferably used, but this may be partially replaced by resins, which yield soluble ammonium compounds, such as shellac, or else their ammonium compounds are peptonized by the alkali resinate present. Ammonium resinate also requires alkali resinate as a peptizer since in itself it is insoluble in water. The fixed alkali for the solution of the resin may be caustic potash or caustic soda. One is not limited with respect to the choice of the ethereal oil, but as a matter of fact turpentine oil, which is cheap, will often be used.

The carrying out of the process is extremely simple, since the dissolution of the resin and of the colloid, which may have been added, can be effected by addition of alkali lye and ammonia with stirring only and without heating. It is also possible however to prepare the solution without stirring, either in an open vessel or under pressure. Instead of water, solutions of colouring substances can advantageously be used when carrying out the process.

The following examples explain the production of the above described inks and binders:

*Example 1.*—2.0 kg. of colophony are dissolved with 1.6 kg. of 10% potash lye and 0.24 kg. of ammonia having a density of 0.910. The clear solution is treated, while being thoroughly stirred, with 4.0 kg. of water and finally with 0.2 kg. of turpentine oil.

*Example 2.*—In 1.6 kg. of 10% potash lye are dissolved first of all 0.1 kg. of casein. In this liquor, to which 0.24 kg. of ammonia, having a density 0.910, have also been added are dissolved 2.0 kg. of colophony and thereupon 4.0 kg. of water and 0.2 kg. of turpentine oil are introduced under thorough stirring.

*Example 3.*—5 to 25 parts of any desired pigment or pigments, such as are generally used for printing inks, are rubbed up with 100 parts of a binder made according to the above directions. The following dyes made by I. G. Farbenindustrie Aktiengesellschaft may, for example, serve as pigment: baryta lakes of acid dyestuffs, such as orange II or anthosine violet or acid green or even artificial pigment dyes, such as hansa yellow, permanent red, heliomarine blue and so forth.

*Example 4.*—If dough-like pigments are used in place of dry pigments, then the water content of the pigment dough must be considered when making the binding agent. For example: 2.0 kg. of colophony are dissolved with 1.6 kg. of 10% potash lye and 0.24 kg. of ammonia, having a density 0.910. The mixture is then treated, while being thoroughly stirred, with 3.0 kg. of water and 0.2 kg. of turpentine oil. To this binder 1.65 kg. of a 40% color dough are mixed and the whole rubbed up in a color mill. Color doughs are made by the I. G. Farbenindustrie Aktiengesellschaft and are found in the trade, for example under the names Permanentrot F4R Teig, Permanentgelb G Teig, Permanentorange G Teig, Litholrot R Teig.

What we claim is:

Intaglio printing ink, consisting of a binder and a pigment thoroughly mixed together, said binder consisting a reaction product of the following approximate ingredients: 2.0 kg. of colophony, 1.6 kg. of 10 per cent potash lye with about 0.1 kg. casein, 0.24 kg. of ammonia solution having a density of 0.91, mixed with 4.0 kg. of water and 0.2 kg. of turpentine oil.

HANS KURZ.
KARL ALBERT.